United States Patent
Baek et al.

(10) Patent No.: US 6,651,137 B2
(45) Date of Patent: Nov. 18, 2003

(54) HIERARCHICAL RAID SYSTEM INCLUDING MULTIPLE RAIDS AND METHOD FOR CONTROLLING RAID SYSTEM

(75) Inventors: Sung-Hoon Baek, Taejon (KR); Dae-Young Ahn, Daejeon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 108 days.

(21) Appl. No.: 09/818,762

(22) Filed: Mar. 28, 2001

(65) Prior Publication Data

US 2002/0124139 A1 Sep. 5, 2002

(30) Foreign Application Priority Data

Dec. 30, 2000 (KR) ........................................ 2000-86620

(51) Int. Cl.[7] .......................... G06F 12/08; G06F 11/00
(52) U.S. Cl. ............................ 711/114; 711/117; 714/6
(58) Field of Search ................................ 711/114, 117; 714/5, 6

(56) References Cited

U.S. PATENT DOCUMENTS

| | | | |
|---|---|---|---|
| 5,271,012 A | 12/1993 | Blaum et al. | |
| 5,301,297 A | * 4/1994 | Menon et al. | ............... 711/114 |
| 5,862,158 A | 1/1999 | Baylor et al. | |
| 5,978,856 A | * 11/1999 | Jones | ......................... 709/301 |
| 6,101,615 A | 8/2000 | Lyons | |

FOREIGN PATENT DOCUMENTS

JP 08-016328 1/1996 ............. G06F/3/06

OTHER PUBLICATIONS

Wilkes, et al.: *The HP AutoRAID hierarchical storage system*; Mar. 24, 1995; Hewlett–Packard Laboratories, Palo Alto, CA; Technical report HPL–CCD–95–7.

Patterson, et al.; *Introduction to Redundant Arrays of Inexpensive Disks (RAID)*; Computer Science Division, Dept. of Electrical Engineering and Computer Sciences, University of California; IEEE Transaction on Computers, vol. 44, No. 2, Feb. 1995; pp. 112–202.

Patterson, et al.; *A Case for Redundant Arrays of Inexpensive Disks (RAID)*; Computer Science Division, Dept. of Electrical Engineering and Computer Sciences, University of California; 1988 ACM 0–89791–268–3/88/0006/0109; pp. 109–116.

* cited by examiner

Primary Examiner—Gary Portka
(74) Attorney, Agent, or Firm—Jacobson Nolman PLLC

(57) ABSTRACT

In a data storage system based on large capacitance, high performance and high availability through a hierarchical construction of redundant arrays of expensive disks (RAID) and a method for controlling the storage system, in order to provide better reliability and more prominent performance than the traditional RAID, and more particularly, in a hierarchical RAID system provided with a plurality of RAIDs in which at least one RAID composed of a large number of disks is used as a virtual disk, and a method for controlling the RAID system, and further in a record medium capable of being read through a computer having a writing of a program to realize the inventive method; the hierarchical RAID system includes a host computing unit; at least one upper level RAID controlling unit having a first RAID Level X, for controlling a plurality of first lower level RAID controlling units having a second RAID Level Y in order to use a lower level RAID as a virtual disk; and the plurality of first lower level RAID controlling units having the second RAID Level Y, for controlling numerous member disks under a control of the upper level RAID controlling unit so as to be used as the virtual disk of the upper level RAID.

2 Claims, 9 Drawing Sheets

SINGLE DISK FAULT TOLERANCE (RAID Level 5: N−1)

TWO DISKS FAULT TOLERANCE (RAID Level 6: N−2)

THREE DISKS FAULT TOLERANCE (RAID Level 7: N−3)

MIRRORING (RAID Level 1: N/2)

HIERARCHICAL RAID SYSTEM INCLUDING MULTIPLE RAIDS AND METHOD FOR CONTROLLING RAID SYSTEM

FIELD OF THE INVENTION

The present invention relates to a storage system offering large capacitance, high performance, and high availability through a hierarchical construction of RAID and a method for controlling the storage system; and more particularly, to a hierarchical RAID system including virtual disks, each of which is composed of a traditional RAID with a number of disks, and to a method for controlling the RAID system and a recording medium capable of being read through a computer having a writing of a program to realize the inventive method.

PRIOR ART OF THE INVENTION

In the last few years, we have experienced huge disparity between I/O subsystem performance and processing power of a computer system that has been growing steadily. Myers has reported that processor power doubled every 2.25 years since 1978, however the I/O performance has not kept pace with the gains in processing power. As the gap between the performance of processors and I/O systems is becoming large, the overall performance of a computer system will depend on the I/O bottleneck. Therefore, it is essential to balancing the I/O bandwidth and the computational power.

Improving I/O performance, known as data declustering and disk striping in disk array systems has been one of the main research topic for computer architects in recent years. Patterson et al. have proposed Redundant Arrays of Inexpensive Disks (RAID) that is defined by five different levels of RAID (Level 1~5) depending on the data and parity placement scheme. The RAID offers large capacity and high performance using a number of disks, and is a reliable storage system that prevents from data loss by means of single disk redundancy, even if a disk fails.

Redundant arrays of inexpensive disks (hereinafter, referred to as "RAID") offer fault tolerance against disk failures. However a storage system having more disks suffer from less reliability and performance. A RAID architecture tolerating multiple disks failures shows extremely poor performance in comparison with one of the RAID Level 5 due to the complexity of implementation.

Now a day, the demand on huge data-storing capacity required by video on demand, internet data center, data warehousing, digital imaging, nonlinear video editing, and etc increases the number of disks of a RAID. As these trends accelerate, traditional RAID cannot protect from the simultaneous loss of more than one disk. As a result, a lot of research has arisen in disk array system that will not lose data even when multiple disks fails simultaneously.

A RAID is a storage system that offers large capacity and high performance using a number of disks, and is a reliable system that prevents from data loss by means of data redundancy, even if a disk fails. RAID Levels such as Level 0, Level 1, Level 5, Level 6, etc, show different characteristic of reliability and performance. A RAID showing better reliability offers generally poor performance.

The RAID Level 0 is a performance-oriented technology with no redundant data. Therefore the storage system requiring high performance uses this scheme. In this Level, the performance is very good but the reliability falls in proportion to the number of the disks.

The RAID Level 1, or disk mirroring, protects against disk failure by replicating all data stored on the virtual disk at least once. It offers extremely high data reliability, and improves performance. However there is a drawback that extremely many disks are required for this scheme.

The RAID Level 5 protects data loss from single disk failure using single parity disk, however more disks degrade the performance. It suffers still from data reliability because of small amount of parities. The RAID Level 6 improves data reliability using two parity disks, however it suffers from extremely degraded performance in comparison with the RAID Level 5.

Previous works have presented fault tolerant schemes for a disk array tolerating against two disk failures, and another works have presented three-disk-tolerant schemes offering better reliability of a disk array. Their schemes at least double the complexity of implementation in comparison with the RAID Level 5, thus a disk array offering better reliability suffers from severe performance degradation, since practical engineers hesitate to adopt these schemes into a commercial RAID system.

RAID Level 3+1 and Level 5+1 have been introduced to dissolve the performance degradation with attaining high reliability. The RAID Level 3+1 is mirroring of the RAID Level 3, and the RAID Level 5+1 is mirroring of the RAID Level 5. However, there is the drawback that these Levels require too many redundant disks, and their disk utilization is lower than 50%. FIGS. 1A and 1B show the structure of RAID Level 3+1 and 5+1. In the drawing, a RAID 110 is constructed as a copy of two RAID Level 3s 111, 112, and a RAID 120 is constructed as a copy of two RAID Level 5s 121, 122. However, such method also has a weakness that a waste of the disk is serious in comparison with the RAID Level 1.

SUMMARY OF THE INVENTION

Therefore, it is an object of the present invention to provide a hierarchical RAID system having a plurality of RAIDs in which a traditional RAID composed of a large number of disks is used as a virtual disk, in order for a data storing based on large capacitance, high performance, and high availability, and to provide a method for controlling the RAID system, and a record medium capable of being read through a computer having a writing of a program to realize the inventive method.

In accordance with an aspect of the present invention, there is provided a hierarchical RAID system having a plurality of RAIDs, in which at least one RAID having a large number of disks is used as a virtual disk, said hierarchical RAID system comprising: a host computing unit; at least one upper level RAID controlling unit having a first RAID Level (X), for controlling a plurality of first lower level RAID controlling units having a second RAID Level (Y); and the plurality of first lower level RAID controlling units, each of which includes member disks.

In accordance with another aspect of the present invention, there is provided a method for controlling a hierarchical RAID system having a plurality of RAIDs in which at least one RAID composed of a large number of disks is used as a virtual disk, the method includes the steps of: a) giving a read-command of data and parity from an upper level RAID controlling unit to a lower level RAID controlling unit when a write-command for new data is given from a host computer; b) performing an exclusive OR operation of the new data, existing data, and the parity, and executing a write-transmission in the lower RAID controlling unit so as to perform a renewal of the parity and the data according to the execution result of the exclusive OR; c) generating a command for reading the parity and data of a hard disk in the lower level RAID controlling unit according to the read-command of the step a), and transmitting it to the high RAID controlling unit; and d) evoking a reading for the data and a parity value and performing the exclusive OR operation according that the write-command given from the upper level RAID controlling unit becomes the write-transmission of each corresponding lower level RAID controlling unit, and executing the write-transmission for the renewal of parity and data.

In accordance with further another aspect of the present invention, there is provided a hierarchical RAID system having a microprocessor, which is provided so as to utilize at least one RAID composed of a large number of disks as a virtual disk, it is provided for a record medium capable of being read through a computer having a writing of a program, the program being for realizing a first function of giving a reading command for data and parity from a high RAID controlling unit to a lower level RAID controlling unit when a write-command for new data is given from a host computer; a second function of performing an exclusive OR operation of the new data, existing data and the parity, and executing a write-transmission in the lower RAID controlling unit so as to perform a renewal of the parity and the data according to the execution result of the exclusive OR; a third function of generating a command for reading the parity and data of a hard disk in the lower level RAID controlling unit according to the reading command of the first function, and transmitting it to the upper level RAID controlling unit; and a fourth function of evoking a reading for the data and a parity value and performing the exclusive OR operation according that the write-command given from the upper level RAID controlling unit becomes the write-transmission of each corresponding lower RAID controlling unit, and executing the write-transmission for the renewal of parity and data.

BRIEF DESCRIPTION OF THE DRAWINGS

The above and other objects and features of the instant invention will become apparent from the following description of preferred embodiments taken in conjunction with the accompanying drawings, in which.

PREFERRED EMBODIMENT OF THE INVENTION

Hereinafter, preferred embodiments of the present invention will be described in detail with reference to the accompanying drawings.

In a general RAID, a disk is directly constructed with the RAID, meantime, an inventive hierarchical RAID system has the construction that the RAID is provided with a virtual disk as another RAID.

Figure 1A:
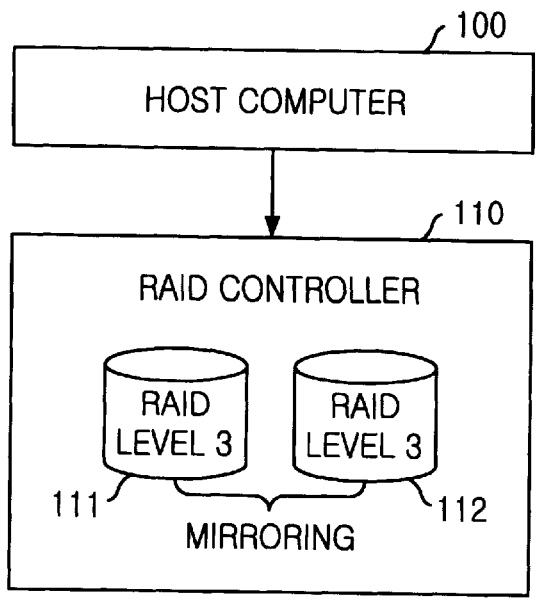
FIGS. 1A and 1B represent constructive exemplary diagrams in a conventional RAID system.
Figure 1B:
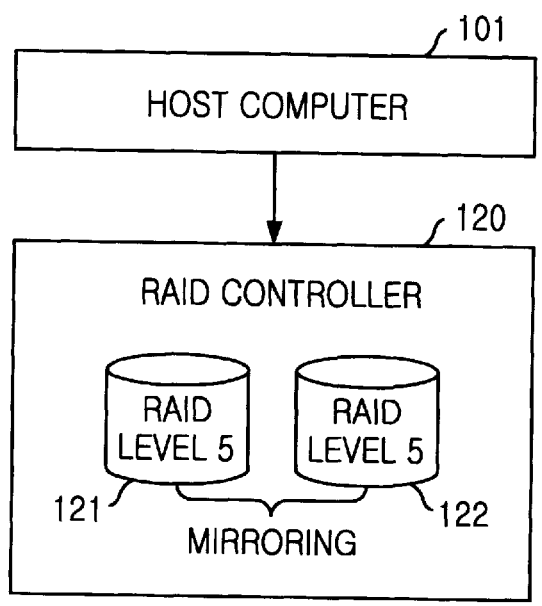
Figure 2:
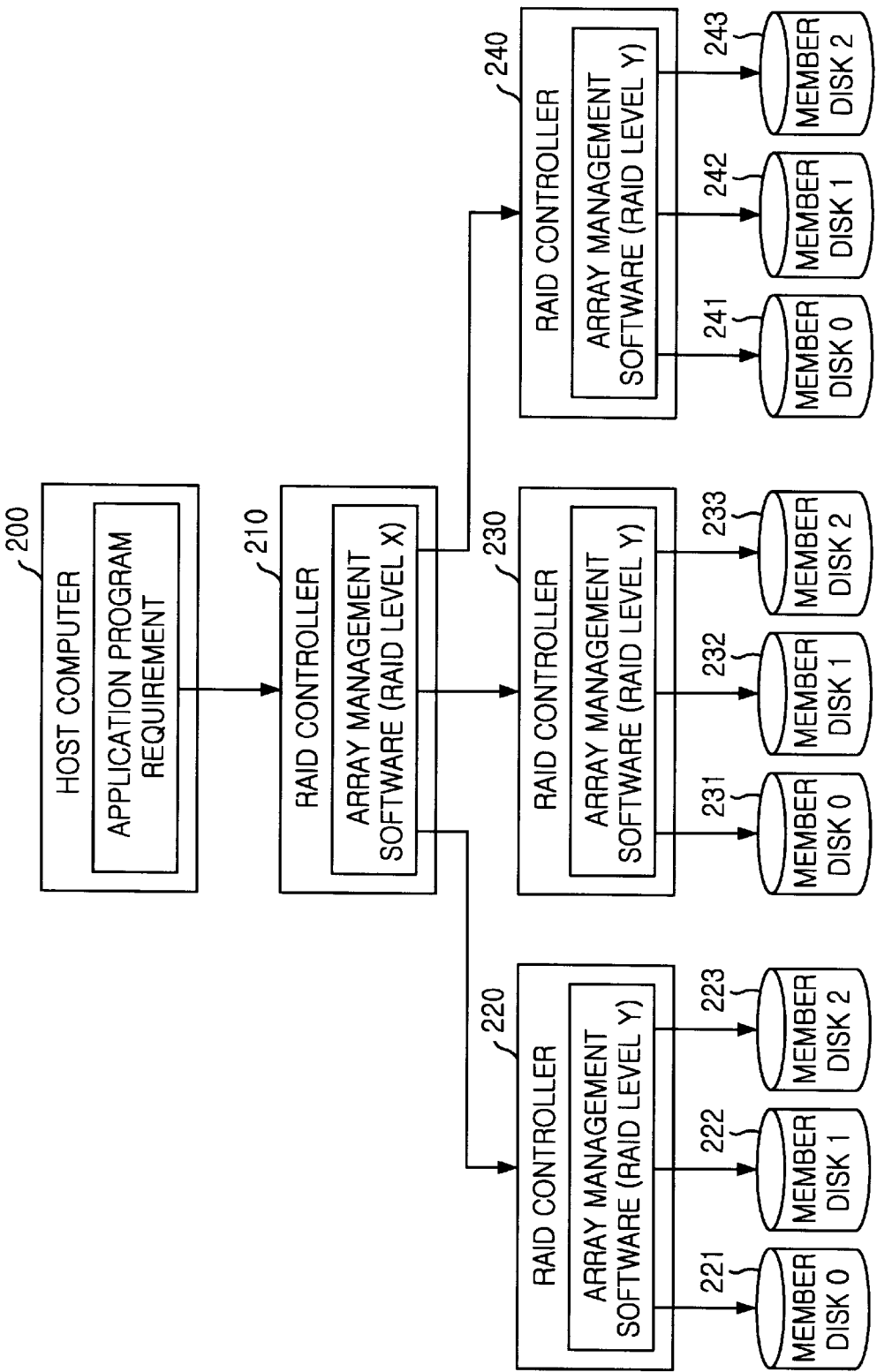
FIG. 2 indicates a block diagram in one embodiment of a hierarchical RAID system in accordance with the present invention.

FIG. 2 is a block diagram of one embodiment for a hierarchical RAID system in accordance with the present invention.

As shown in the drawing, the inventive hierarchical RAID system includes a host computer 200 and numerous RAID controllers based on a hierarchical structure. The upper level RAID controller 210 of a RAID Level X connected to the host computer 200 contains a plurality of lower RAID controllers 220, 230, 240 of a RAID Level Y, and the lower level RAID controllers 220, 230, 240 respectively include member disks 221~223, 231~233, 241~243, wherein X and Y indicate, e.g., numbers of traditional RAID Levels such as 0, 1, 3, 5 and 6 etc. The following RAID constructed by the above-described system is named as the homogeneous hierarchical RAID Level X×Y.

The RAID Levels may individually exist in independent RAID controllers, or exist in one RAID controller partially or overall. It is represented 2 as a depth of the hierarchical RAID Level that the high RAID 210 contains the lower level RAIDs 220, 230, 240, the lower level RAID being constructed by disks.

Figure 3:
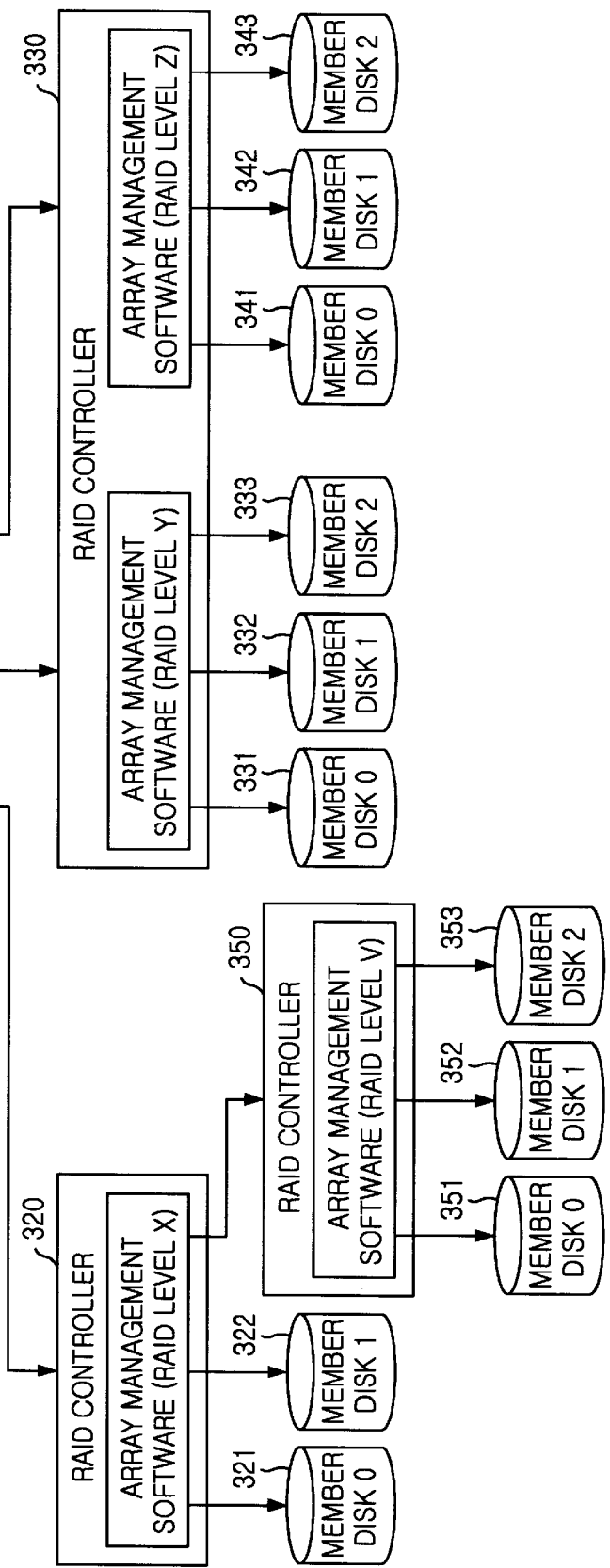
FIG. 3 shows a block diagram in another embodiment of a hierarchical RAID system in accordance with the present invention.
Figure 3:
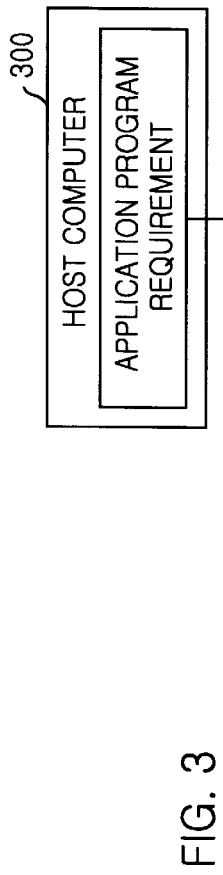

For reference, as shown in FIG. 3, a RAID Level W 310 contains a lower level RAID Level X 320. This lower level RAID also contains a RAID Level V 350. Such construction represents 3 as the depth of the hierarchical RAID constructed with the disks. Like this, the depth of the hierarchical RAID can be extended as 2 or more according to a necessity.

FIG. 3 is a block diagram of another embodiment for the inventive hierarchical RAID system.

In another hierarchical RAID system of the invention shown in this drawing, it shows the construction of one embodiment for a heterogeneous hierarchical RAID, and the RAID controllers of each hierarchy respectively have optional RAID Levels. That is, only one RAID Level exists in the RAID controller 320, but two or more of RAID Levels may exist as shown in a RAID controller 330. In such heterogeneous hierarchical RAID, the hierarchical RAID 350 can be provided by member disks. In addition, all the above RAID Levels may be contained into one RAID controller. Such hierarchical RAID Levels are represented as the heterogeneous hierarchical RAID.

As afore-described, the RAID Level 6 having prominent reliability offers very bad performance in comparison with the widely used RAID Level 5. The hierarchical RAID Level 5×5 means that the upper level RAID includes the Level 5 and each of the lower level RAIDs includes the Level 5, and its performance is similar to the RAID Level 5 and its reliability is more prominent than the RAID Level 6. It can also made up hierarchical RAID Levels 0×5, 5×0, 1×3, 3×1, 1×5, 5×1, 5×5, 5×6, 6×5 or 6×6, which offers different performance and reliability from each other.

These respective hierarchical RAID Levels provide various characteristics of better reliability and performance than the traditional RAID.

The reliability between the traditional RAID and the hierarchical RAID is compared with each other by means of Markov process, as follows.

In general, the reliability of the RAID is measured in mean-time-to-data-loss (MTTDL). The MTTDL can be numerically obtained as follows, in order to get the reliability based on various construction of the inventive hierarchical RAID.

The reliability of the hierarchical RAID can be obtained from the Markov process for the failure/repair model as shown in FIGS. 4A to 4D. If the failure rate and repair rate of the disk are characterized by the exponential distribution and disks are independent (Reference to "R. Billinton and R. Allian, 'Reliability Evaluation of Engineering System: Concepts and Techniques', Perseus Publishing January 1992"). FIGS. 4A to 4D are an exemplary diagrams of one embodiment of a Markov process for the reliability per RAID Level.

Each branch of a state denotes transition rate to next state. For example, $(N-2)\lambda$ of two-disk-down state is failure rate (transition rate to three-disk-down state) when two disks have failed. $2\mu$ of two-disk-down state is repair rate (transition rate to single-disk-down state) when two disk have failed, where N is the number of total disks, the repair rate per disk $\mu$ is 1/MTTR (mean-time-to-repair), and the failure rate per disks $\lambda$ equals 1/MTTF (mean-time-to-failure)

Mean-time-to-data-loss (MTTDL) cannot be obtained only using the differential equation, but also the fundamental matrix M that is defined as the following equation (1).

$$M = [I-Q]^{-1} \quad (1)$$

where, Q is the truncated stochastic transitional probability matrix.

The truncated stochastic transitional probability matrixes $Q_5$, $Q_6$, $Q_7$ for the single-disk, two-disk, and three-disk fault tolerant RAID of (A), (B), and (C) for FIG. 4, can be written as the following equation (2).

$$Q_5 = \begin{bmatrix} 1 - N\lambda & N\lambda \\ \mu & 1-(N-1)\lambda - \mu \end{bmatrix}$$

$$Q_6 = \begin{bmatrix} 1 - N\lambda & N\lambda & 0 \\ \mu & 1-(N-1)\lambda - \mu & (N-1)\lambda \\ 0 & 2\mu & 1-(N-2)\lambda - 2\mu \end{bmatrix}$$

$$Q_7 = \begin{bmatrix} 1 - N\lambda & N\lambda & 0 & 0 \\ \mu & 1-(N-1)\lambda - \mu & (N-1)\lambda & 0 \\ 0 & 2\mu & 1-(N-2)\lambda - 2\mu & (N-2)\lambda \\ 0 & 0 & 3\mu & 1-(N-3)\lambda - 3\mu \end{bmatrix}$$

(2)

From the equations (1) and (2), the fundamental matrix $M_5$ of the RAID Level 5 is defined by the following equation (3).

$$M_5 = [I - Q]^{-1} \quad (3)$$

$$= \left[ \begin{bmatrix} 1 & 0 \\ 0 & 1 \end{bmatrix} - \begin{bmatrix} 1 - N\lambda & N\lambda \\ -\mu & 1-(N-1)-\mu \end{bmatrix} \right]^{-1}$$

$$= \frac{1}{N(N-1)\lambda^2} \begin{bmatrix} (N-1)\lambda + \mu & N\lambda \\ \mu & -N\lambda \end{bmatrix}$$

$$= [m_{ij}]$$

The element $m_{ij}$ of $M_5$ is the average time spent in state j given that the process starts in state i before reaching the data-loss state. It was assumed that the system start in state 1 (all-disk-up) and therefore MTTDL is the sum of the average time spent in all state j given that the process starts in state 1. It can formally be written as the following equation (4).

$$MTTDL = \sum_{j=1}^{d+1} m_{1j} \quad (4)$$

where d+1 is the column size of the fundamental matrix. The MTTDL of the RAID Level 5 can be written as the following equation (5)

$$MTTDL_5 = m_{11} + m_{12} \quad (5)$$

$$= \frac{(2N-1)\lambda + \mu}{N(N-1)\lambda^2}$$

In the same ways, the MTTDL of the RAID Level 6 and 7 can be derived by equations (6) and (7).

$$MTTDL_6 = \frac{(3N^2 - 6N + 2)\lambda^2 + (3N-2)\lambda\mu + 2\mu^2}{N(N-1)(N-2)\lambda^3} \quad (6)$$

$$MTTDL_7 = \frac{(4N^3 - 18N^2 + 22N - 6)\lambda^3 + (6N^2 - 14N + 6)\lambda^2\mu + (8N - 6)\lambda\mu^2 + 6\mu^3}{N(N-1)(N-2)(N-3)\lambda^4} \quad (7)$$

Figure 4A:
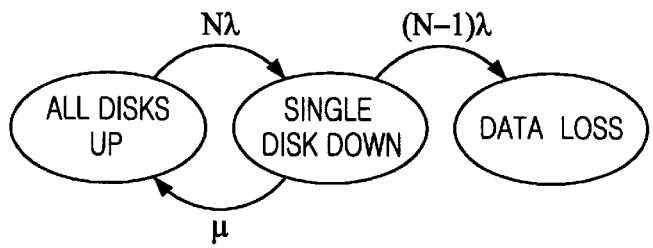
FIGS. 4A to 4D show Markov diagrams of the RAID Level 5, 6, 7 and 1, the RAID Level 6 and 7 denoting a two-disk and three-disk fault tolerant RAID, respectively.
Figure 4B:
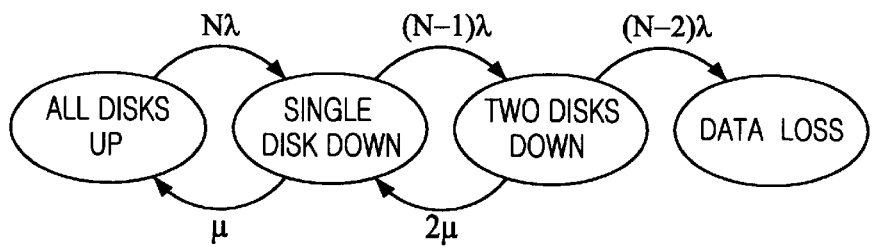
Figure 4C:
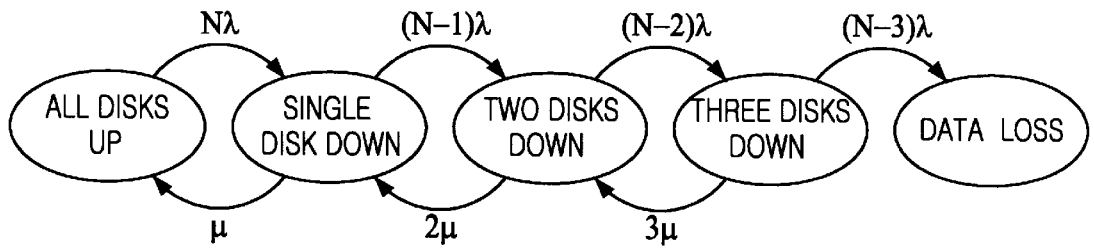
Figure 4D:
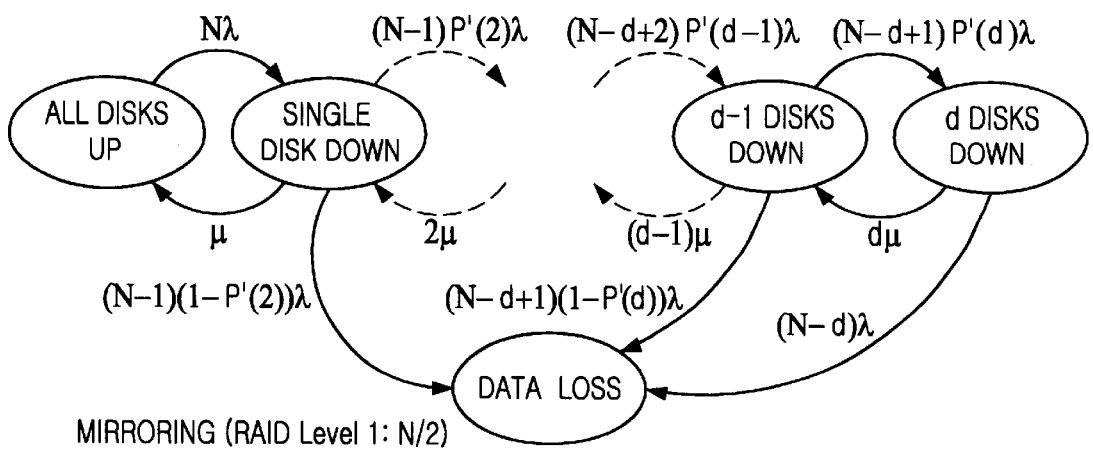

The MTTDL of the single-disk, two-disk, three-disk fault tolerant RAID can be obtained simply, meanwhile the MTTDL of the RAID Level 1 is somewhat complex. The transitional probability from single-disk-down state to two-disk-down state is neither zero nor one, because if a second failed disk does not correspond to the mirror of the first failed disk, there is no data loss. FIG. 4D shows the Markov diagram of the RAID Level 1. Transitions from single-disk-down state to (d−1)-disk-down state have the probability P'(n) that one more disk fails without data loss in the (n−1)-disk-down state. (N−k)P'(k+1) means the probabilistic number of fault tolerable disks without data loss in the k-disk-down state. The P'(n) is defined by the following equation (8).

$$P'(n) = P(n \mid n-1) = \frac{P(n \cap n-1)}{P(n-1)} = \frac{P(n)}{P(n-1)} \quad (8)$$

$$= \begin{cases} 1, & \text{if } n = 1 \\ P(n)/P(n-1), & \text{if } n \leq 2 \end{cases}$$

where $P(n)$ is the safety probability function that there is no data loss when n disks fail simultaneously. In the mirroring, the data is safe, if each of n mirroring set of N/2 mirroring groups has only one faulty disk. Hence the safety probability function $P_1(n)$ of the RAID Level 1 can be written as the following equation (9).

$$P_1 = \frac{_{N/2}\dot{C}_{n'} 2^n}{_N\dot{C}_n}, \text{ where } _n\dot{C}_r = \begin{cases} _nC_r, & \text{if } n \geq r \\ 0, & \text{otherwise} \end{cases} \quad (9)$$

From the equations 1, 8 and 9, and FIG. 4D, the inverse of the fundamental matrix of the RAID Level 1 can be drived by the following equation (10).

$$M_1^{-1} = [I - Q_1] = [a_{m,n}]_{(d+1)\times(d+1)}$$

$a_{k+1,k} = -ku$, $\forall k$ such that $1 \leq k \leq d$ $a_{k,k} = (N-k+1)\lambda + (k-1)u$, $\forall k$ such that $1 \leq k \leq d+1$ $a_{k,k+1} = -(n-k+1)P_1'(k)\lambda$, $\forall k$ such that $1 \leq k \leq d$ $a_{m,n} = 0$, $\forall m$, $\forall n$ such that $m+2 \leq n$ or $m-2 \leq n$ (10)

where d is the maximum number of fault-tolerable disks. In the case of the RAID Level 1, d is equal to N/2. The symbolic equation of the inverse of $M^{-1}$ cannot be simply derived from Numerical Expression 10, thus we choose numerical method to calculate the MTTDL.

The hierarchical RAID Level 5×5 tolerates at least three disk failures, and at most i+j−1 disk failures. Where, i is the number of virtual disks comprising the upper level RAID, and j is the number of physical disks comprising each lower level RAID. The total number of disks including check and information disks is equal to i×j.

Derivation of the MTTDL of the HiRAID Level 5×5 is also complex. It is similar to the HiRAID Level 1, if $P_1(n)$ of equation 10 is replaced with $P_{5\times5}(n)$, which can be defined by the following equation (11).

$P_{5\times5}(1) = 1$ $P_{5\times5}(2) = 1$ $P_{5\times5}(3) = 1$ $P_{5\times5}(4) =$ the probability that four disks fail in four separate groups without data loss+the probability that two disks fail in a same group and one disk fails in another group and one disk fails in the other group without data loss+the probability that three disks fail in a same group and one disk fails in another group without data loss+the probability that four disks fail in a same group without data loss.

=

$\{_i\dot{C}_4(_j\dot{C}_1)^4 + _i\dot{C}_3 \cdot _3\dot{C}_1 \cdot _j\dot{C}_2 \cdot$ $(_j\dot{C}_1)^2 + _i\dot{C}_2 \cdot _2\dot{C}_1 \cdot _j\dot{C}_3 \cdot _j\dot{C}_1 + _i\dot{C}_1 \cdot _j\dot{C}_4\}/_{ij}\dot{C}_4$ (11)

By the above-mentioned method, $P_{5\times5}(5)$ is defined by the following equation (12).

$P_{5\times5}(5) = \{_i\dot{C}_5(_j\dot{C}_1)^5 + _i\dot{C}_4$ $\cdot _4\dot{C}_1 \cdot _j\dot{C}_2 \cdot (_j\dot{C}_1)^3 + _i\dot{C}_3$ $\cdot _3\dot{C}_1 \cdot _j\dot{C}_3 \cdot (_j\dot{C}_1)^2 + _i\dot{C}_2$ $\cdot _2\dot{C}_1 \cdot _j\dot{C}_4 \cdot _j\dot{C}_1 + _i\dot{C}_1 \cdot _j$ $\dot{C}_5\}/_{ij}\dot{C}_5$ (12)

From the above two expressions, $P_{5\times5}$ can be generalized by the following equation (13).

$$P_{5\times5}(n) = \frac{1}{_{ij}\dot{C}_n}\left\{_i\dot{C}_n \cdot j^n + \sum_{k=1}^{n-1} {_i\dot{C}_{n-k}} \cdot (n-k) \cdot _j\dot{C}_{k+1} \cdot j^{n-k-1}\right\}$$ (13)

If the information of the lower level RAID is unknown to the upper level RAID, the safety probability function $P_{0\times5}(n)$ of the hierarchical RAID Level 0×5 is the probability that n disks fail in n separate groups without data loss.

$P_{0\times5}(n) = (_i\dot{C}_n \cdot j^n)/_{ij}\dot{C}_n$ (14)

The safety probability function $P^{5\times0}(n)$ of the hierarchical RAID Level 5×0 is the probability that n disks fail in a same group without data loss.

$P_{5\times0}(n) = (_i \cdot _j\dot{C}_n)/_{ij}\dot{C}_n$ (15)

The safety probability functions of the hierarchical RAID Level 1×5 and 5×1 are obtained by assigning i=2 and j=2 to the equation (13), respectively.

$P_{1\times5}(n) = (2 \cdot _j\dot{C}_n + 2 \cdot _j\dot{C}_{n-1} \cdot j)/_{2j}\dot{C}_n$ (16)

Figure 5:
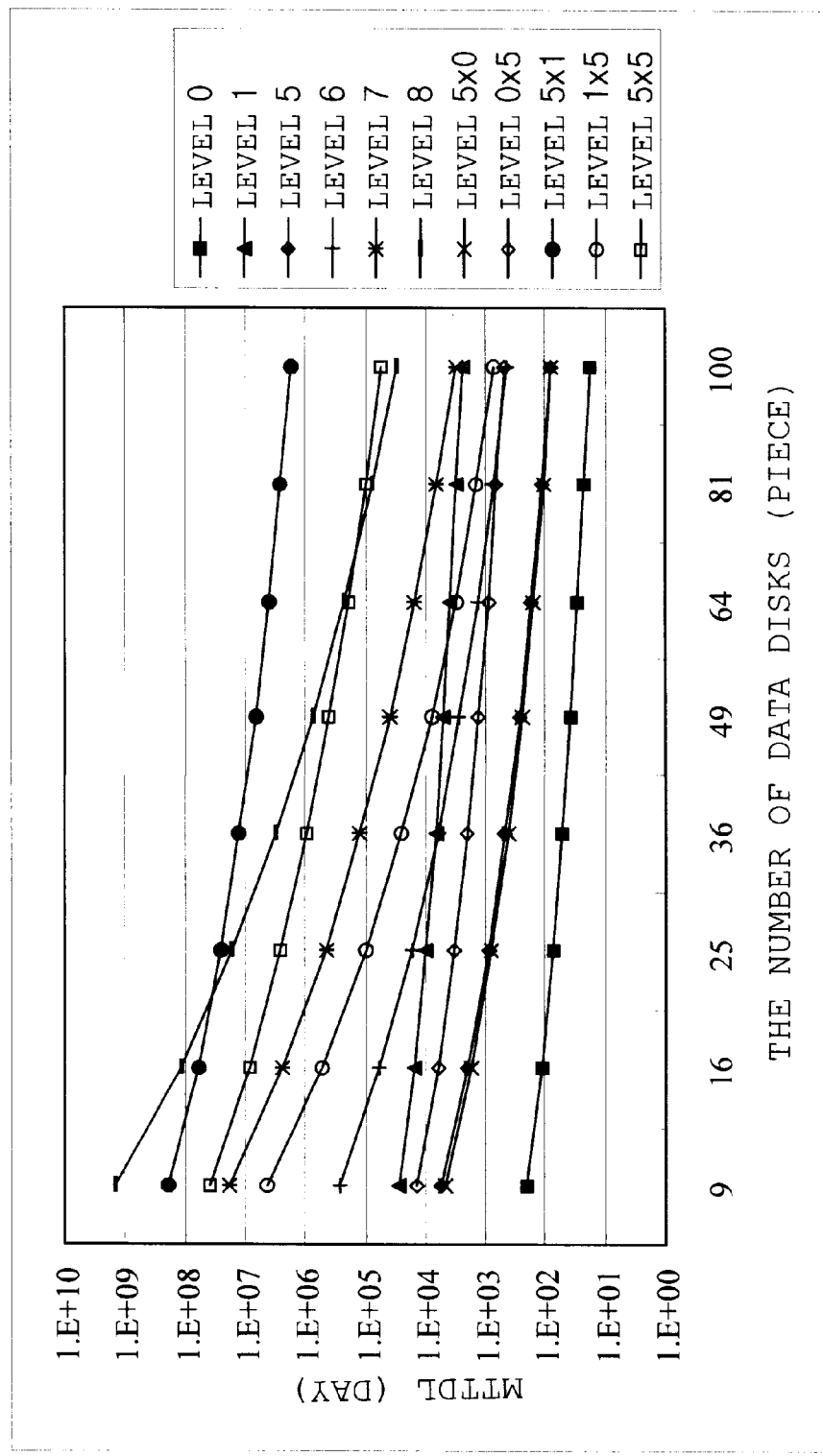
FIG. 5 shows the MTTDLs of RAID and hierarchical RAID when the MTTR is one week, the MTTF is five years, and i=j for the hierarchical RAID Level 5×0, 0×5, and 5×5, Level 8 denotes a virtual four-disk-failure tolerant RAID, MTTDL can be obtained from the equation (10) by replacing with d=4 and P(n)=1 for all n, Level 0 is a disk array without redundant disk, and MTTDL equals MTTF/N.

$P_{5\times1}(n) = (_i\dot{C}_n \cdot 2^n + _i\dot{C}_{n-1} \cdot (n-1) \cdot 2^{n-2})/_{2i}\dot{C}_n$ In FIG. 5, the MTTDLs based on various structures in the traditional RAID and the inventive homogeneous hierarchical RAID are compared through the MTTDL gained in the above expression, where the mean time to failure MTTF is five years and the mean time to repair is one week. The RAID Levels 7 and 8 mean virtual three-disk-failure and four-disk-failure tolerant RAID, respectively.

Referring to FIG. 5, it can be noted that the hierarchical RAID Level 5×1 is most prominent in an aspect of the reliability. However the disk utilization is less than 50%. Meanwhile, the disk utilization of the inventive hierarchical RAID Level 5×5 equals (i−1)(j−1)/(ij), which is 81% when i=j=10. The hierarchical RAID Level 5×5 offers better reliability than the three-disk-failure tolerant RAID (Level 7) that can hardly be implemented in real system due to its complexity. As the number of disks increases, the reliabilities of the hierarchical RAIDs decrease more slowly than those of traditional RAIDs. By this reason, the Level 5×5 outruns the four-disk-failure tolerant RAID (Level 8) when the number of disks is large, where the number of disks of this condition depends on MTTF and MTTR, The Level 0×5 also outruns the Level 6 when the number of disks is large We can know that the Level 5+1 (Level 1×5) is poorer than the Level 1 and the Level 5×1, hence the reciprocal configuration of the Level 1×5 is better. The Level 0×5 is also better than the Level 5×0.

The RAID Level 5×5 has prominent excellent reliability and good performance. The worst shortcoming of the RAID Level 6 is that the RAID Level 6 has very bad performance in comparison with the RAID Level 5., while, the hierarchical RAID Level 5×5 has performance similar to the RAID Level 5.

Figure 6A:
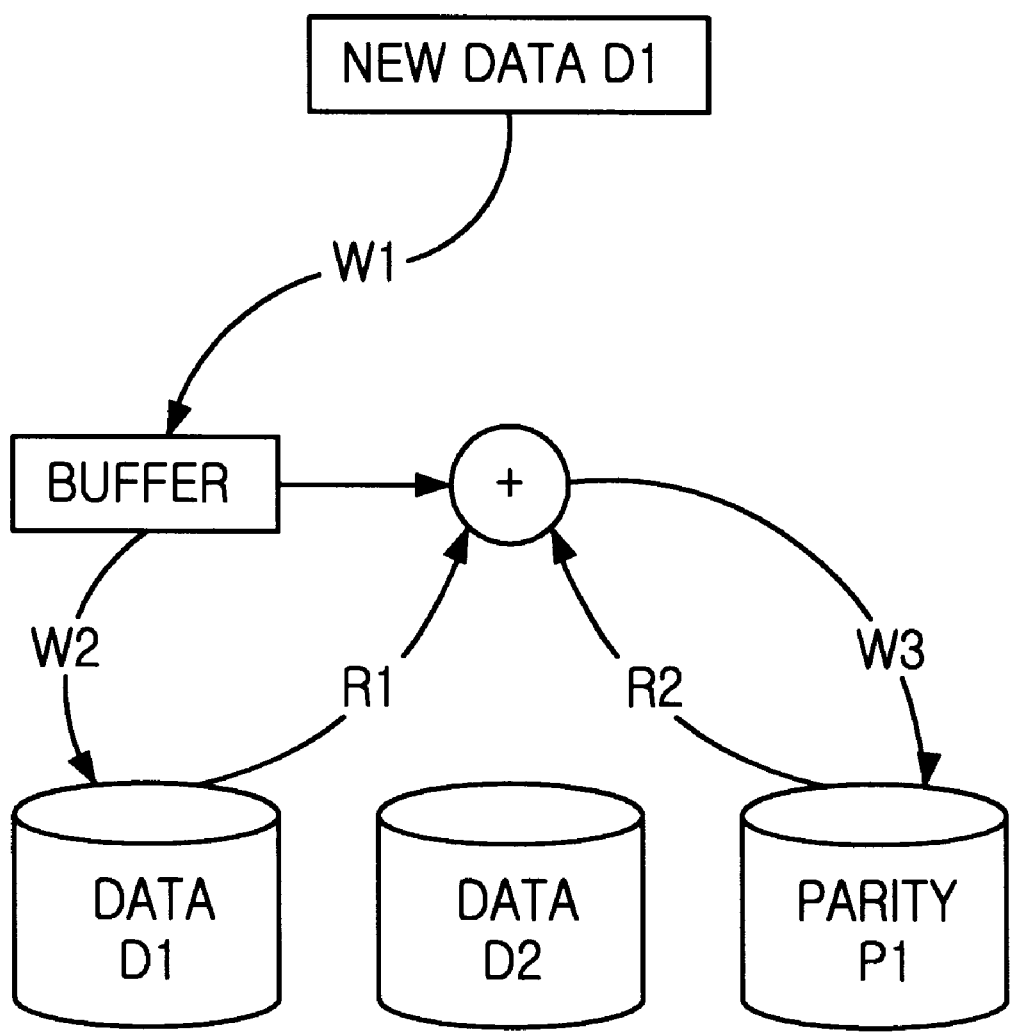
FIGS. 6A and 6B are exemplary diagrams of a small-write operation of the conventional RAID Level 5.
Figure 6B:
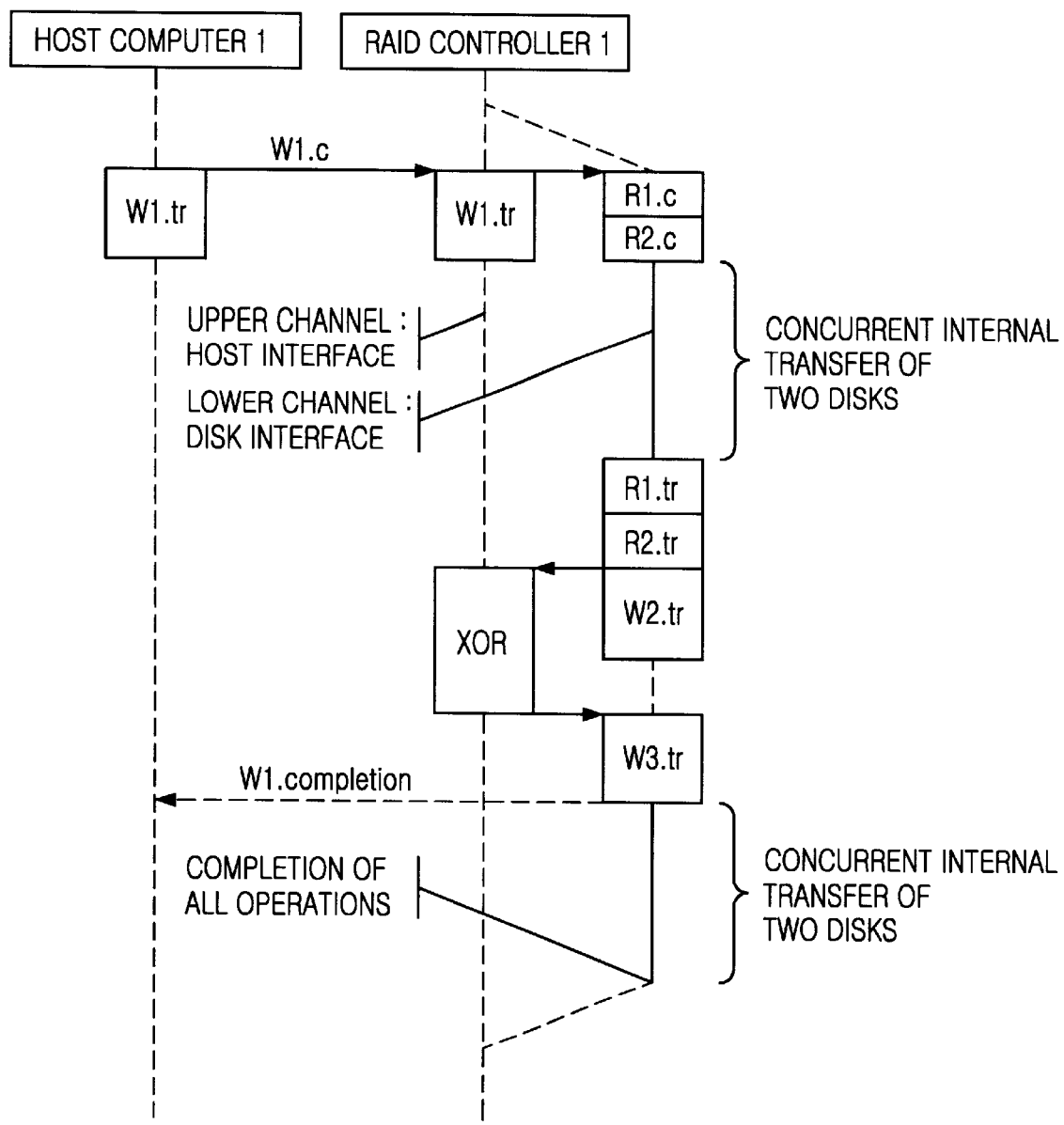
Figure 7A:
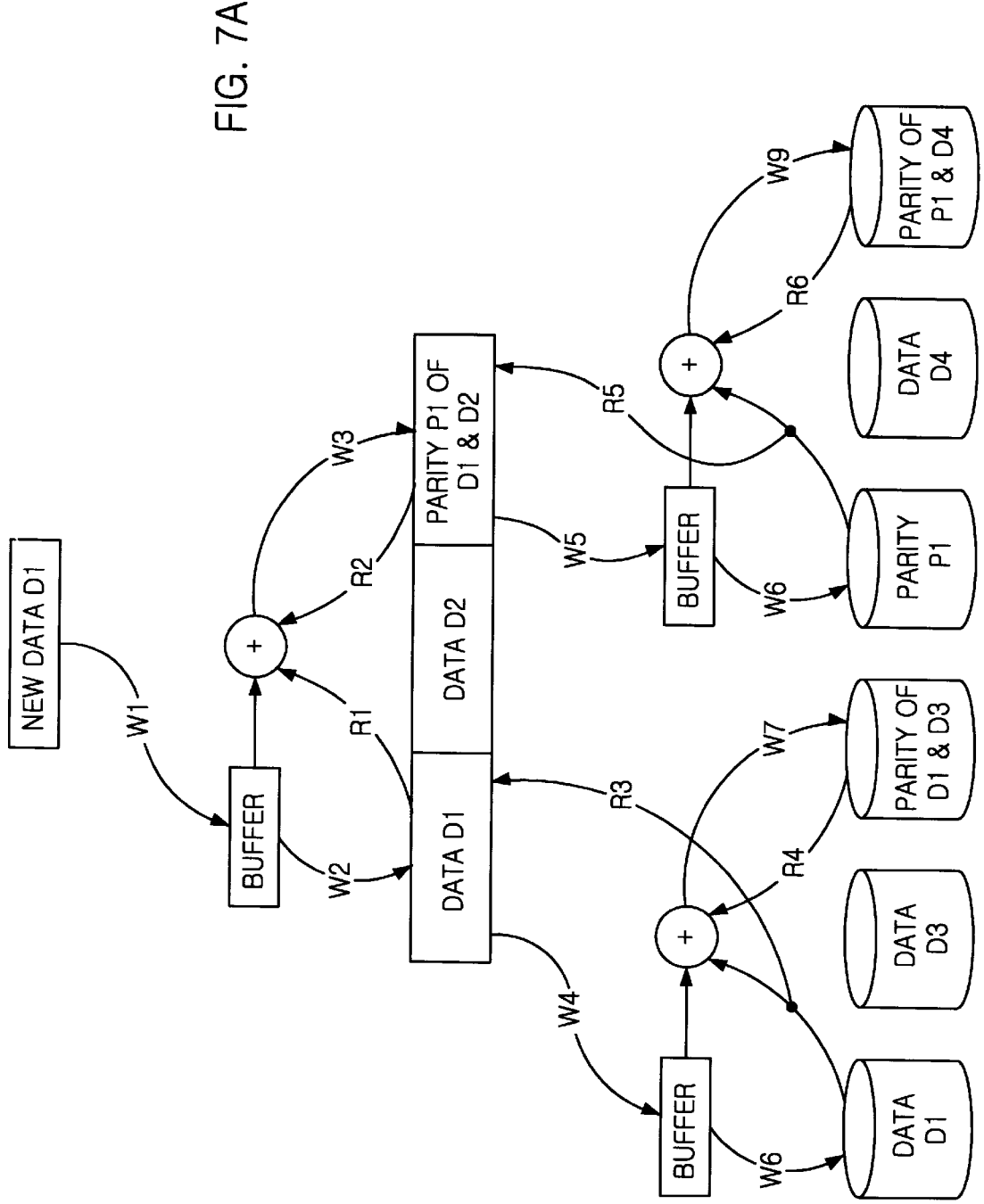
FIGS. 7A and 7B indicate exemplary diagrams of one embodiment for a small-write operation of the inventive hierarchical RAID Level 5×5.
Figure 7B:
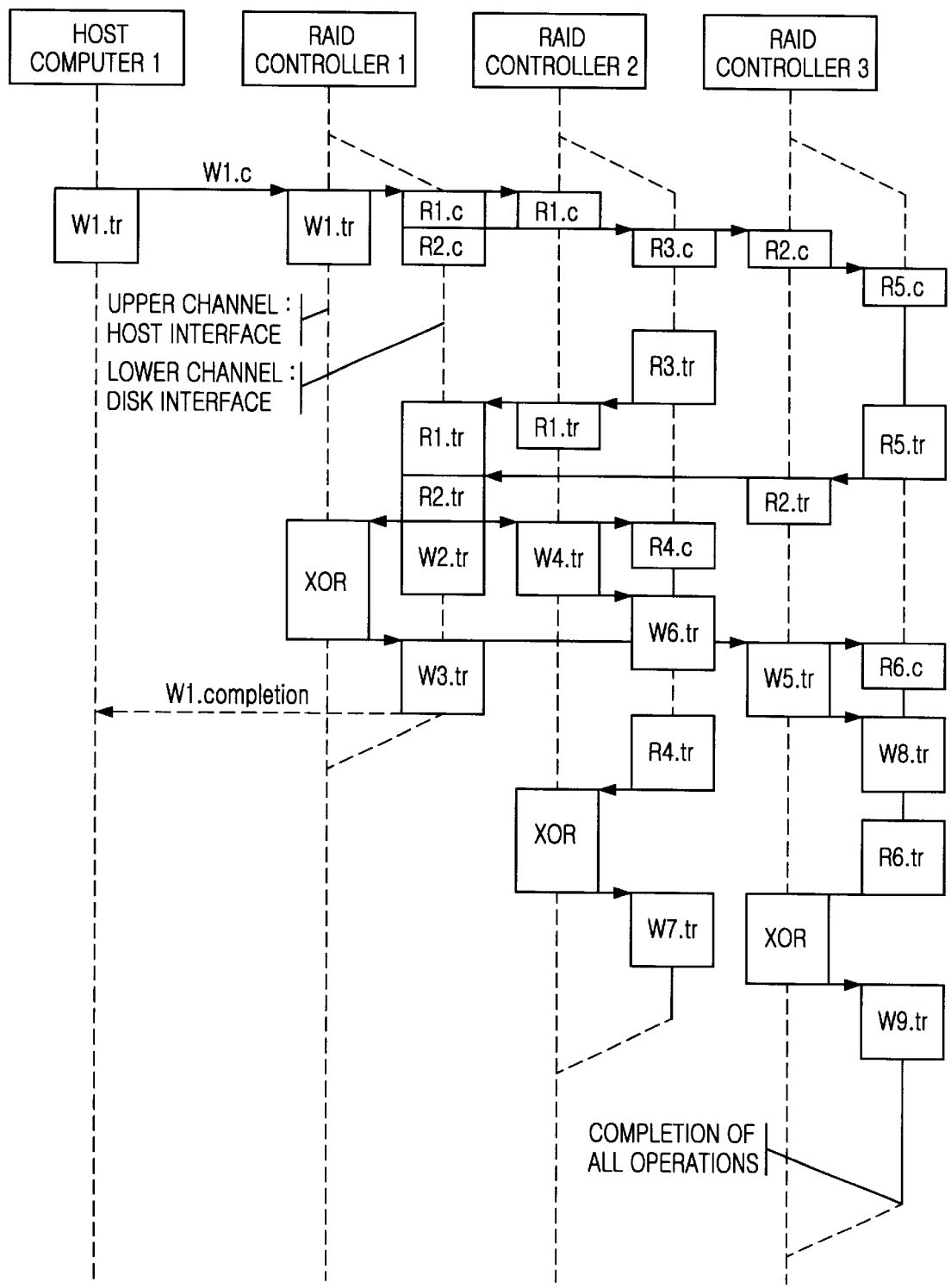

FIGS. 6A and 6B are exemplary diagrams of one embodiment for a small-write operation of the RAID Level 5 in the invention, and FIGS. 7A and 7B are exemplary diagrams of one embodiment for an operation of a small-write operation of the hierarchical RAID Level 5×5 of the invention. W.tr, R.tr, R.c, and XOR in the drawings respectively represent a write-transmission, a read-transmission, a read-command and an exclusive OR.

FIG. 6B illustrates a sequence diagram generated in the host computer and the RAID controller, matching to the operation of FIG. 6A.

As shown in FIGS. 6A and 6B, when a write-command for new data D1 is transmitted (W1.tr), a read-command R1.c, R2.c is sent to a disk through a lower channel in order to read the data D1 and parity P1. Then a transmission of R1 and R2 corresponding to that is performed in the disk (R1.tr, R2.tr), and an exclusive OR for the new data D1, previous data D1, and the parity P1 is executed (XOR). Finally, the write-transmission (W3.tr) for renewing a result value of the exclusive OR to the parity P1 and the write-transmission (W2.tr) for renewing the new data D1 are generated.

FIG. 7B depicts a sequence diagram generated in three RAID controllers of the host computer and the hierarchical RAID, matching to the operation of FIG. 7A.

As shown in FIGS. 7A and 7B, when the write-command for the new data D1 is given from the host computer to the upper level RAID controller (W1.tr), the upper level RAID controller sends the read-command for the data D1 and the parity P1 to the lower level RAID controller (R1.c, R2.c). Next, when the read-transmission corresponding to that is performed (R1.tr, R2.tr), the exclusive OR for the new data D1, the previous data D2 and the parity P1 is executed (XOR). Then, the write-transmission (W2.tr) to the lower level RAID controller is generated in order for the renewal (W3.tr) of the parity P1 for its result value and the new data D1.

During the execution of such operation, the read-command R1.c transmitted from the upper level RAID controller to the lower level RAID controller is generated as the read-command (R3.c) and transmission (R3.tr) for reading the data D1 of the hard disk in the lower level RAID controller, and the lower level controller transmits it to the upper level controller (R1.tr).

Further, the read-command R2.c transmitted from the upper level RAID controller to the lower level RAID controller is generated as the read-command (R5.c) and transmission (R5.tr) for reading the parity P1 of the hard disk in the lower level RAID controller. Then the lower level controller transmits it to the high controller (R2.tr).

Finally, write-transmissions W2 and W3 transmitted from the upper level RAID controller become write-transmissions W4 and W5 of the lower RAID controller, respectively. Such two write-operations correspond to the data D1 and the parity P1 shown in FIG. 7. The operations are independently generated in two RAID controllers.

The write-command W4 from the upper level RAID controller generates a reading for the data D1 and a reading (R4.c+R4.tr) for parity values of D1 and D3. The exclusive OR is also performed. Then the write-transmission (W7.tr) for the renewal of the parity of D1 and D3 and the renewal (W6.tr) of the data D1 are generated.

The write-command W5 from the upper level RAID controller generates a reading of the parity P1 and a reading for parity values of P1 and D4 (R6.c +R6.tr). Then the exclusive OR is executed, and the write-transmission (W9.tr) for the renewal of the parity of P1 and D4, and the renewal (W8.tr) of the parity P1.

The complexity of the hierarchical RAID Level 5×5 is about three times of that of the RAID Level 5, however the operations of the hierarchical RAID disperse throughout three RAID controllers. From FIGS. 6A and 6B, the operation of the RAID Level 5, 05, can be written as the following equation (17).

$$O5 = 3 \times W.tr + 2 \times R.tr + 2 \times R.c + XOR \quad (17)$$

Operations of the controllers 1, 2 and 3 of the RAID Level 5×5 shown in FIG. 7 can be written as the following equation (18).

$$Oc1 = 3 \times W.tr + 2 \times R.tr + 2 \times R.c + XOR$$

$$Oc2 = 3 \times W.tr + 3 \times R.tr + 3 \times R.c + XOR$$

$$Oc3 = 3 \times W.tr + 3 \times R.tr + 3 \times R.c + XOR \quad (18)$$

The RAID controller 2 and the RAID controller 3 have one more read-command and one more read-transmission comprising single read-transaction. In other words, the RAID Level 5 requires five data transmission requests by one small-write request, and in a case of the hierarchical RAID transmission Level 5×5, the upper level RAID controller generates five data transmissions and the lower level RAID controller generates six data transmissions. However the additional read-transaction resides in the upper channel interfacing the upper level RAID, thus it does not bottleneck the overall performance, because the lower channel has more read/write transactions. Also, the large-write and read operation of the hierarchical RAID Level 5×5 is equal to that of the RAID Level 5 except slight extra latency that it takes for commands to pass through the upper level RAID controller.

The inventive method described above can be embodied as a program and this program can be stored as a type of being read through a computer at a record medium such as CDROM, RAM, ROM, a floppy disk, a hard disk, and an optical magnetic disk etc.

As afore-mentioned, in accordance with the present invention, the inventive technique is provided to remarkably settle problems of a general RAID, for instances, the more the number of the disks is getting, the lower a reliability becomes rapidly, or many disks are required for good performance, or a seriously bad performance is caused in order to heighten the reliability. That is, there is a prominent effect that the disk utilization is considerably increased and high reliability is also provided in an aspect of failure repair, by using, as a virtual disk, the traditional RAID constructing with a large number of disks.

It will be apparent to those skilled in the art that various modifications and variations can be made in the present invention without deviating from the spirit or scope of the invention. Thus, it is intended that the present invention cover the modifications and variations of this invention provided they come within the scope of the appended claims and their equivalents.

What is claimed is:

1. A method for controlling a hierarchical RAID system having a plurality of RAIDs in which at lest one RAID composed of a plurality of disks is used as a virtual disk, said method comprising the steps of:

a) giving a read-command of existing data and parity from an upper level RAID controlling unit to a lower level RAID controlling unit when a write-command for new data is given from a host computer;

b) performing an exclusive OR of the new data, existing data and the parity, and executing a write-transmission in the lower level RAID controlling unit so as to perform a renewal of the parity and the data according to the execution result of the exclusive OR operation;

c) generating a command for reading the parity and data of a hard disk in the lower level RAID controlling unit according to the read-command of the step a), and transmitting the command to the upper level RAID controlling unit; and d) evoking a reading for the data and a parity value and performing the exclusive OR so that the write-command given from the upper level RAID controlling unit becomes a write-transmission to each corresponding lower level RAID controlling unit, and executing the write-transmission for the renewal of parity and data.

2. A record medium capable of being read through a computer so as to use at least one RAID having a plurality of disks as a virtual disk, in a hierarchical RAID system having a microprocessor, the record medium characterized in that the computer has a writing of a program to realize:

a first function of giving a read-command for existing data and parity from an upper level RAID controlling unit to a lower level RAID controlling unit when a write-command for new data is given from a host computer;

a second function of performing an exclusive OR of the new data, existing data and the parity, and executing a write-transmission in the lower level PAID controlling unit so as to perform a renewal of the parity and the data according to the execution result of the exclusive OR operation;

a third function of generating a command for reading the parity and data of a hard disk in the lower level RAID controlling unit according to the read-command of the first function, and transmitting the command to the upper level RAID controlling unit; and a fourth function of evoking a reading for the data and a parity value and performing the exclusive OR so that the write-command given from the upper level RAID controlling unit becomes the write-transmission to each corresponding lower upper level RAID controlling unit, and executing the write-transmission for the renewal of parity and data.

* * * * *